(12) United States Patent
Bon et al.

(10) Patent No.: US 12,497,054 B2
(45) Date of Patent: Dec. 16, 2025

(54) SYSTEM AND METHOD FOR DETERMINING A LENGTH OF A VEHICLE

(71) Applicant: Volvo Truck Corporation, Gothenburg (SE)

(72) Inventors: Philippe Bon, St Bonnet de Mure (FR); Yann Quibriac, Lyons (FR)

(73) Assignee: Volvo Truck Corporation, Gothenburg (SE)

( * ) Notice: Subject to any disclaimer, the term of this patent is extended or adjusted under 35 U.S.C. 154(b) by 148 days.

(21) Appl. No.: 18/500,193

(22) Filed: Nov. 2, 2023

(65) Prior Publication Data

US 2024/0166215 A1 May 23, 2024

(30) Foreign Application Priority Data

Nov. 23, 2022 (EP) .................................. 22209103

(51) Int. Cl.
*B60W 40/12* (2012.01)
*B60W 40/10* (2012.01)
(Continued)

(52) U.S. Cl.
CPC ............ *B60W 40/12* (2013.01); *B60W 50/14* (2013.01); *G01S 13/89* (2013.01); *B60W 40/10* (2013.01);
(Continued)

(58) Field of Classification Search
CPC ...... B60W 40/12; B60W 40/10; B60W 50/14; B60W 60/0016; B60W 60/0018;
(Continued)

(56) References Cited

U.S. PATENT DOCUMENTS 5,523,947 A * 6/1996 Breen ................... B62D 13/00
280/426
9,211,889 B1 12/2015 Hoetzer et al.
(Continued)

FOREIGN PATENT DOCUMENTS

WO 2020207572 A1 10/2020
WO 2021007427 A1 1/2021
(Continued)

OTHER PUBLICATIONS

Extended European Search Report for European Patent Application No. 22209103.5, mailed May 8, 2023, 5 pages.

*Primary Examiner* — Brandon Z Willis
(74) *Attorney, Agent, or Firm* — Withrow & Terranova, PLLC

(57) ABSTRACT

A computer system comprising a processor configured to determine that a first articulation angle between a first frame and a second frame of an articulated vehicle is above a first angle threshold; determine a first vehicle length based on the first articulation angle and a first distance from a first distance determination device to a first rear portion of the second frame on a first side of the articulated vehicle; determine that a second articulation angle between the first frame and the second frame is above a second angle threshold on a second side of the articulated vehicle; determine a second vehicle length; and determine whether a difference between the first vehicle length and the second vehicle length is lower than a predetermined threshold distance.

20 Claims, 4 Drawing Sheets

(51) Int. Cl.
*B60W 50/14* (2020.01)
*G01S 13/89* (2006.01)

(52) U.S. Cl.
CPC ... *B60W 2300/14* (2013.01); *B60W 2420/403* (2013.01); *B60W 2420/408* (2024.01)

(58) Field of Classification Search
CPC ....... B60W 60/00186; B60W 2300/10; B60W 2300/12; B60W 2300/14; B60W 2300/145; B60W 2300/125; B60W 2300/13; B60W 2420/403; B60W 2420/408; B60W 2422/95; B60W 2530/201; B60W 2530/203; B60W 2530/205; G01S 13/89; G01S 13/895; G01S 13/931; G01S 2013/93274; G01B 9/02; G01B 11/02; G01B 11/04; G01B 11/043; G05D 2109/16; G01C 1/00
See application file for complete search history.

(56) References Cited

U.S. PATENT DOCUMENTS

| | | | |
|---|---|---|---|
| 10,391,939 | B2 | 8/2019 | Naserian et al. |
| 2014/0297128 | A1* | 10/2014 | Lavoie ............ B60W 30/18036 |
| | | | 701/41 |
| 2019/0061816 | A1 | 2/2019 | Stabel et al. |
| 2020/0372802 | A1* | 11/2020 | Kim ...................... G01S 13/931 |
| 2022/0292981 | A1* | 9/2022 | Lee ....................... B60W 30/12 |
| 2022/0299626 | A1* | 9/2022 | Chen ................. B60W 60/0015 |

FOREIGN PATENT DOCUMENTS

| | | |
|---|---|---|
| WO | 2021151516 A1 | 8/2021 |
| WO | 2022096255 A1 | 5/2022 |

\* cited by examiner

SYSTEM AND METHOD FOR DETERMINING A LENGTH OF A VEHICLE

RELATED APPLICATIONS

The present application claims priority to European Patent Application No. 22209103.5, filed on Nov. 23, 2022, and entitled "SYSTEM AND METHOD FOR DETERMINATION A LENGTH OF A VEHICLE," which is incorporated herein by reference in its entirety.

TECHNICAL FIELD

The disclosure relates generally to an articulated vehicle. In particular aspects, the disclosure relates to a system and method for determining a length of an articulated vehicle. The disclosure can be applied in heavy-duty vehicles, such as trucks, buses, and construction equipment. Although the disclosure may be described with respect to a particular vehicle, the disclosure is not restricted to any particular vehicle.

BACKGROUND

In the field of heavy vehicles such as trucks and the like, articulated vehicles can have different lengths depending on the type of trailer or lorry being coupled to a tractor or truck and also depending on the type of cargo carried. Accurate information of the length of the vehicle as a whole is important both for safety purposes since the vehicle length is used by various vehicle control systems and also to ensure that the length of the vehicle does not exceed regulations.

SUMMARY

According to a first aspect of the disclosure, it is provided a computer system comprising a processor configured to: determine that a first articulation angle between a first frame of an articulated vehicle and a second frame of the articulated vehicle is above a first predetermined angle threshold on a first side of the articulated vehicle; determine a first vehicle length based on the first articulation angle and a first distance from a first distance determination device arranged in the first frame to a first rear portion of the second frame on the first side of the articulated vehicle; determine that a second articulation angle between the first frame and the second frame is above a second predetermined angle threshold on a second side of the articulated vehicle; determine a second vehicle length based on the second articulation angle and a second distance from a second distance determination device arranged in the second frame to a second rear portion of the second frame on the second side of the articulated vehicle; and determine whether a difference between the first vehicle length and the second vehicle length is lower than a predetermined threshold distance.

The first aspect of the disclosure may seek to improve the length determination of an articulated vehicle by determining the length of the vehicle based on distance measurements performed on both sides of the vehicle. A technical benefit may include that the length of a vehicle can be accurately determined also in situations where there is a difference in length between different sides of a rear end of a vehicle. In particular, by determining whether a difference between the first vehicle length and the second vehicle length is lower than a predetermined threshold distance, it can be determined if the length measurement is reliable or if additional steps need to be taken to verify the total length of the vehicle.

According to a second aspect of the disclosure, it is provided a method, comprising: determining, by a processor device of a computer system, that a first articulation angle between a first frame of an articulated vehicle and a second frame of the articulated vehicle is above a first predetermined angle threshold on a first side of the articulated vehicle; determining, by the processor device, a first vehicle length based on the first articulation angle and a first distance from a first distance determination device arranged in the first frame to a first rear portion of the second frame on the first side of the articulated vehicle; determining, by the processor device, that a second articulation angle between the first frame and the second frame is above a second predetermined angle threshold on a second side of the articulated vehicle; determining, by the processor device, a second vehicle length based on the second articulation angle and a second distance from a second distance determination device arranged in the second frame to a second rear portion of the second frame on the second side of the articulated vehicle; and determining, by the processor device, whether a difference between the first vehicle length and the second vehicle length is lower than a predetermined threshold distance.

The second aspect of the disclosure may seek to improve the length determination of an articulated vehicle by determining the length of the vehicle based on distance measurements performed on both sides of the vehicle in a similar manner as the first aspect.

In some examples, the method further comprises determining that a difference between the first vehicle length and the second vehicle length is lower than the predetermined threshold distance and that a total vehicle length is the largest of the first vehicle length and second vehicle length. A technical benefit may include that the total length of the vehicle can be accurately determined even if the rearmost portion of the vehicle is uneven or has protruding features.

In some examples, the method further comprises providing the total vehicle length to a driver maneuverability control system and adapting the driver maneuverability control system based on the length of the vehicle. A technical benefit may include that vehicle systems receive a reliable determination of the total vehicle length and can thereby more accurately adapt the driver maneuverability control system.

In some examples, the method further comprises providing the total vehicle length to a navigation system and adapting a route of the vehicle based on the length of the vehicle. A technical benefit may include that the route can be adapted based on an accurate total length of the vehicle including any cargo potentially protruding outside of the vehicle as such.

In some examples, each of the first and second distance determination devices comprise an image acquisition device configured to acquire an image of the rear portion of the second frame. A technical benefit may include that it is possible to accurately determine the distance between the image detection device and a rear portion of the vehicle by identifying features of the vehicle in the acquired images.

In some examples, the first and second distance determination device comprises a corresponding first and second radar transceiver each configured to acquire a radar image. A technical benefit may include that a radar can form a detailed image of a rear portion of the vehicle so that the distance from the known location of the radar transceiver to the rear portion of the vehicle can be accurately determined.

In some examples, the first and second radar transceivers are arranged to face a direction substantially perpendicular to a longitudinal axis of the first frame and wherein the first and second radar transceivers are further configured to detect an object adjacent to the vehicle. A technical benefit may include that the radar transceivers can be used for multiple functions of the vehicle. For example, the radar transceivers can be used both as the above described distance determination devices as well as to detect other objects such as pedestrians adjacent to the vehicle and the radar transceivers can also form part of a lane change support system and/or of a blind spot detection system.

In some examples, the method further comprises determining that the difference between the first vehicle length and the second vehicle length is higher than a predetermined threshold distance and providing a notification to a vehicle control system. A technical benefit may include that if the difference between the two different vehicle lengths determined at respective sides of the vehicle is too large, it may be required to determine the reason for the difference. A vehicle control system can thereby be operable to redo the length determination and/or to prompt a driver to redo the length determination.

In some examples, the method further comprises determining that the difference between the first vehicle length and the second vehicle length is higher than the predetermined threshold distance and providing a notification to a driver of the vehicle. A technical benefit may include that a driver is alerted if manual verification of the vehicle length is required. A difference in length exceeding the predetermined threshold distance can also be caused by cargo protruding on only one side of the vehicle in which case a driver may be able to verify if the current vehicle configuration is in accordance with regulations.

In some examples, the method further comprises determining that the vehicle is in motion when determining the first distance and the second distance. A technical benefit may include that image processing to distinguish the rear portion of the vehicle from the vehicle surroundings can be simplified.

In some examples, determining the respective first and second distance comprises identifying a difference between a moving background portion and a first and second rear portion in the respective first and second image. A technical benefit may include improved accuracy since when the vehicle is moving, the background portion may exhibit motion blur and if a plurality of images is captured and compared, the background will change while a first and second rear portions of the vehicle will be substantially the same in the plurality of images.

In some examples, each of the first and second distance determination device is arranged between a respective front and rear wheel of the first frame. A technical benefit may include that the distance determination device is capable of determining a distance both to the rear portion of the vehicle as well as to objects adjacent to the vehicle.

In some examples, each of the first and second distance determination devices is arranged in front of an articulated joint of the vehicle. A technical benefit may include that the distance determination device can avoid being obscured by a trailer of a vehicle during a turn.

In some examples, the articulated joint is located between front wheels and rear wheels of the first frame. Moreover, in some examples the first frame is a host vehicle, and the second frame is a trailer.

In some examples, a vehicle comprises the processor device to perform the method of any of the above examples.

In some examples, a computer program product comprises program code for performing, when executed by the processor device, the method of any of the above examples.

In some examples, a control system comprises one or more control units configured to perform the method of any of the above examples.

In some examples, a non-transitory computer-readable storage medium comprises instructions, which when executed by the processor device, cause the processor device to perform the method of any of the above examples.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

Figure 1:
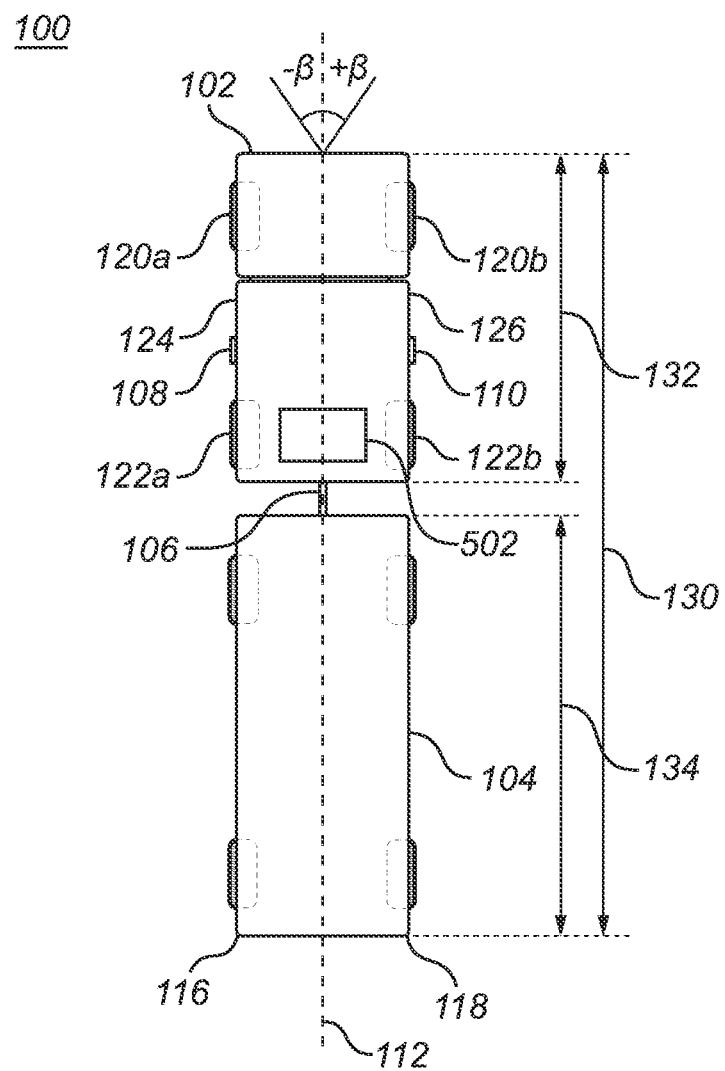
FIG. 1 is an exemplary vehicle comprising a computer system according to one example.

FIG. 1 is an exemplary articulated vehicle 100 comprising a computer system 500 according to one example. The following examples of the inventive concept will be described with further reference to FIGS. 2A-2B schematically illustrating the articulated vehicle 100 for different articulation angles and to FIG. 3 illustrating a block diagram outlining steps of a method according to one example of the inventive concept.

The computer system 500 comprises a processor 502 configured to: determine 300 that a first articulation angle 302 between a first frame 102 of an articulated vehicle 100 and a second frame 104 of the articulated vehicle 100 is above a first predetermined angle threshold on a first side 124 of the articulated vehicle; determine 304 a first vehicle length 306 based on the first articulation angle 302 and a first distance from a first distance determination device 108 arranged in the first frame 102 to a first rear portion 116 of the second frame 104 on the first side 124 of the articulated vehicle 100; determine 308 that a second articulation angle 310 between the first frame 102 and the second frame 104 is above a second predetermined angle threshold on a second side 126 of the articulated vehicle 100; determine 312 a second vehicle length 314 based on the second articulation angle 310 and a second distance from a second distance determination device 110 arranged in the second frame to a second rear portion 118 of the second frame 104 on the second side 126 of the articulated vehicle 100; and determine 316 whether a difference 318 between the first vehicle length and the second vehicle length is lower than a predetermined threshold distance.

The articulated vehicle 100 may be any type of vehicle comprising at least two frames 102, 104 with an articulated joint 106 between two frames 102, 104 where the first frame 102 may be referred to as a truck, tractor, cab, tow car or the like, and the second frame 104 may be referred to as a trailer, cargo trailer, lorry or the like. Moreover, the articulated joint 106 may be located between the first frame 102 and the second frame 104 as illustrated in FIG. 1 or it may be located in the first frame, for example between the front wheels 120*a-b* and rear wheels 122*a-b* of the first frame. Furthermore, the distance determination devices are arranged in front of the mechanical coupling forming the articulated joint 106 between the first and second frame 102, 104.

Figure 2A:
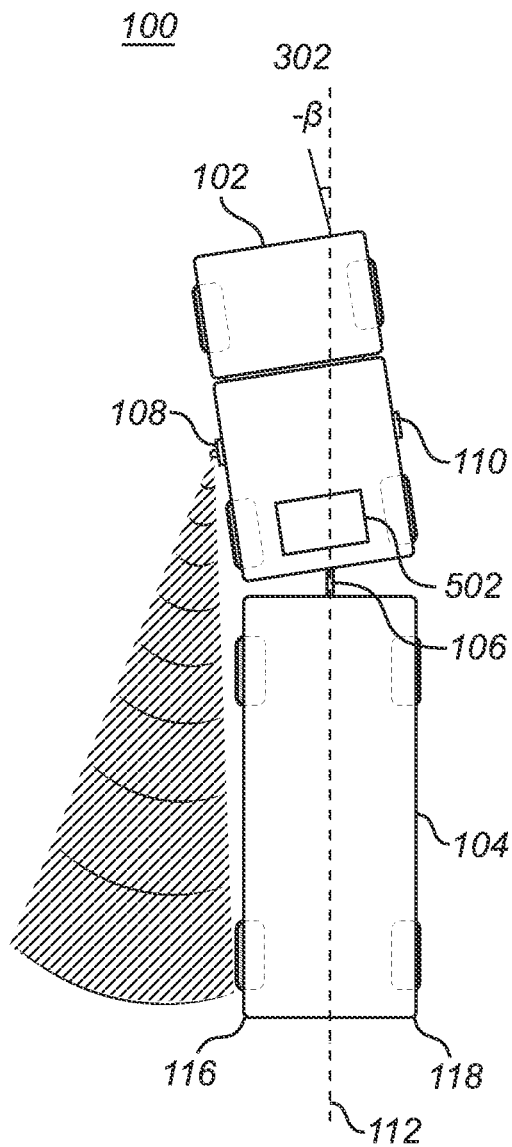
FIGS. 2A-2B are exemplary vehicles schematically illustrating features of the inventive concept.
Figure 2B:
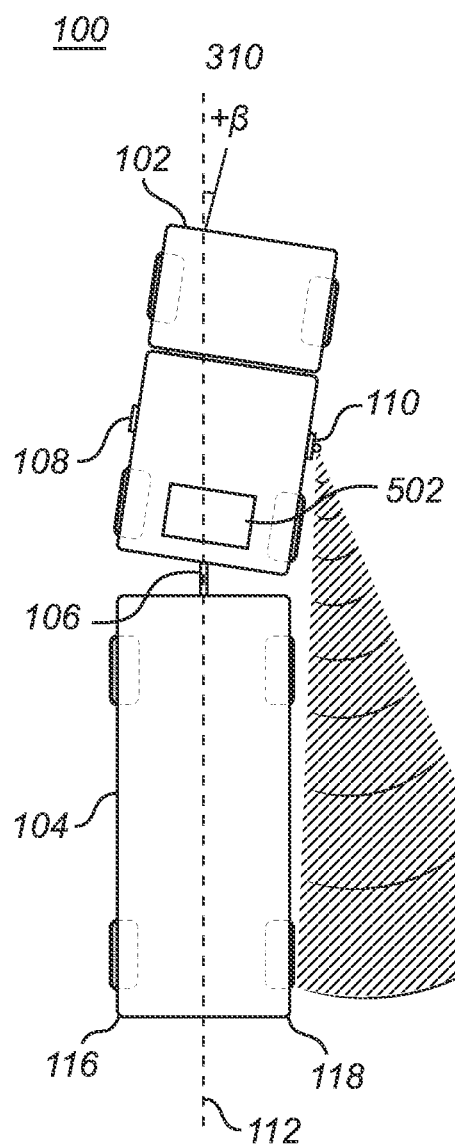
Figure 3:
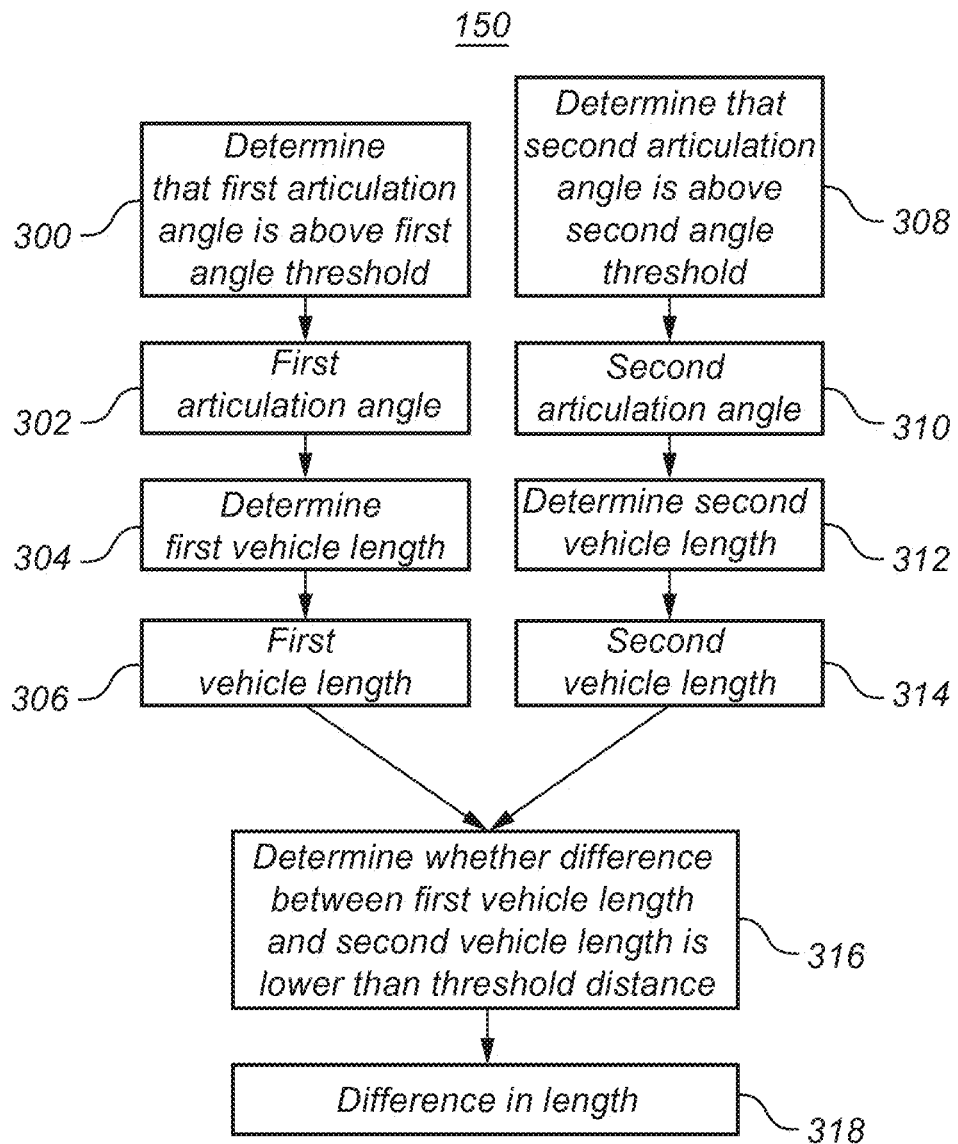
FIG. 3 is a block diagram schematically illustrating a method according to one example.

The articulation angle describes the difference in angle between the first frame 102 and the second frame 104 of the articulated vehicle 100 as illustrated by the angles ±β illustrated in FIG. 1 and FIGS. 2A-2B. When the two frames 102, 104 are aligned along the same longitudinal axis 112 of the vehicle 100, the articulation angle is 0°.

Since it can be assumed that the precise locations of the distance determination devices 108, 110 in the first frame 102 are known, and in particular the distance from each distance determination device 108, 110 to a front end of the vehicle, the length of the vehicle can be determined by knowing the distance between the distance determination device 108, 110 and the respective rear portion 116, 118 of the vehicle 100 together with the corresponding articulation angle 302, 310. The first and second rear portion 116, 118 may be first and second rear corners of the trailer, e.g., the left and right rear corners, and rear here refers to the rearmost portion of the vehicle 100 so that the total length 130 of the vehicle 100 can determined. In some examples, the length 132 of the first frame 102 may be known and by knowing the total length 130 it is possible to determine the length 134 of the second frame, e.g., of a trailer.

Moreover, cargo such as logs or other items extending beyond the vehicle 100 are taken into account in the distance determination in order to determine the total length 130 of the vehicle 100. In such examples, the rear portion of the vehicle 100 may be an item protruding beyond the second frame as such.

The articulation angle can be determined in several different ways, for example using an angle sensor located in the articulation joint which in some applications is referred to as a "fifth wheel". It could also be possible to determine the articulation angle using accelerometers located in the first and second frame and/or by optical angle determination devices. Accordingly, the articulation angle can be assumed to be known with sufficient accuracy to accurately determine the vehicle length.

In some examples, the distance determination device 108, 110 comprises an image acquisition device such as a radar. However, the distance determination device may also be any other device capable of distance determination such as a LIDAR, camera or the like. An advantage of using a radar is that existing side radars of the vehicle may be used also for the purpose of vehicle length determination, thereby enabling the inventive concept with components existing in the vehicle. Moreover, radars are capable of capturing an image also in bad weather conditions or in other situations where visibility is reduced.

Figure 4:
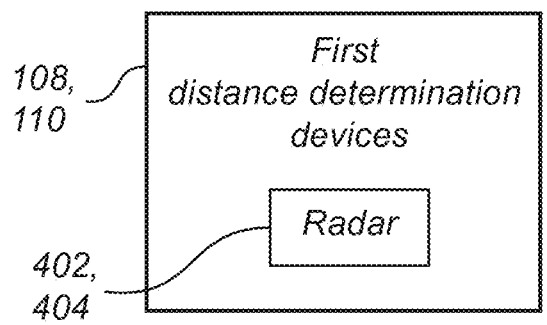
FIG. 4 is a block diagram schematically illustrating features of the inventive concept.

The described inventive concept is based on the principle that a certain articulation angle is required for the distance determination device 108, 110 to be able to determine the distance between the distance determination device 108, 110 and the respective rear portion 116, 118 of the vehicle 100. In particular, in examples where the distance determination device 108, 110 comprises an image acquisition device such as a radar 402, 404 as schematically illustrated in FIG. 4, there needs to be an uninterrupted line of sight between the radar 402, 404, and the rear portion 116, 118 of the vehicle 100. In an example using a side facing radar having a lobe angle of 172°, an articulation angle of at least 4° is required to acquire a radar image of the rear portion of the vehicle 100. However, depending on the type and arrangement of the radar, the required threshold articulation angle may differ. In applications where it is known that cargo is protruding in the central rear portion of the second frame 104, a larger articulation angle may be required to accurately determine the length of the vehicle.

FIGS. 2A-2B schematically illustrate determining the length of the articulated vehicle 100 where in FIG. 2A, the vehicle 100 performs a left turn so that the articulation angle −β exceeds a first threshold angle of for example 4°. The first distance determination device 108 arranged on the left side of the first frame, e.g., a truck, captures one or more images of the first rear portion 116 of the second frame 104, which for low articulation angles is the rearmost left corner of the second frame 104. Next, in FIG. 2B, the vehicle 100 performs a right turn and the same procedure is performed on the right side of the vehicle by the second distance determination device 110 once the articulation angle exceeds the second predetermined angle threshold on the second side 126 of the vehicle.

In some examples, the vehicle 100 is in motion when determining the first distance and the second distance. The distance determination devices 108, 110 can thereby determine the first and second length during a left turn and a right turn of the vehicle. Such a maneuver can for example be performed after loading of the vehicle or after connection of a first and second frame 102, 104 to ensure that the length of the vehicle is within regulations and that vehicle system have an accurate measure of the total vehicle length 130.

Moreover, determining the respective first and second distance may comprise identifying a difference between a moving background portion and a first and second rear portion in respective first and second image captured by the first and second radars 402, 404. In some examples, multiple images are captured at different articulation angles in order to improve the quality of the resulting image and consequently of the distance determinations. Moreover, a greater articulation angle may improve the distance determinations since a higher articulation angle will provide a larger area for radar wave reflection. Thereby, the distance determination can advantageously be based on a composite image composed from images at a range of articulation angles, or the distance may be determined as an average of distances determined at different articulation angles. It should be noted that the same principle is applicable also for distance determination devices which are not image acquisition devices, but which may be based on ultrasound, IR or the like.

In scenarios where the two determined vehicle lengths are different, i.e., the lengths determined on the left and right side of the vehicle 100, the largest of the two lengths is taken to represent the true total vehicle length 130. Accordingly, if a difference between the first vehicle length and the second vehicle length is lower than the predetermined threshold distance, the total vehicle length 130 is determined to be the largest of the first vehicle length and second vehicle length. A total vehicle length 130 can thereby be provided to a driver maneuverability control system and the driver maneuverability control system can be adapted based on the total length 130 of the vehicle 100. For example, vehicle handling parameters, braking and other safety features, engine parameters and the like can be adjusted based on the total vehicle length 130. The total vehicle length 130 can also be automatically matched against regulatory systems to determine if the total vehicle length 130 is within regulations.

Moreover, the total vehicle length 130 may advantageously be provided to a navigation system so that a route of the vehicle can be adapted based on the length of the vehicle. There may for example be routes which have limitation on the length of the vehicle and other routes may be more suitable if the vehicle exceeds a certain length.

In examples where it is determined that the difference between the first vehicle length and the second vehicle length is higher than the predetermined threshold distance, a notification can be provided to a vehicle control system. That the difference between the first and second vehicle length exceeds the threshold length can for example depend on cargo protruding on only one side of the vehicle in which case a vehicle and/or the driver can confirm that the distance determination is accurate, and the total length 130 of the vehicle can be set to the maximum of the two determined vehicle lengths. A difference in vehicle length exceeding the threshold distance can also be the result of an erroneous measurement in which case the driver can be prompted to redo the distance determination, e.g., by making a left turn and right turn exceeding the threshold articulation angles. If the difference remains also for consecutive measurements, the driver can be prompted to take further action as described above. In an autonomous vehicle, the autonomous vehicle operator can be notified in the difference in length exceeds the threshold distance. Moreover, until further actions are taken either by the driver or by an autonomous vehicle operator, the maximum determined length can be taken to represent to be the total length 130 of the vehicle.

In one example, the inventive concept relates to a system for determining the length of an articulated vehicle 100 comprising a first frame 102, a second frame 104 and an articulated joint 106 connecting the first frame 102 and the second frame 104. The system comprises: a first distance determination device 108 arranged in the first frame 102 on a first side 124 of the vehicle 100; a second distance determination device 110 arranged in the first frame 102 on a second side 126 of the vehicle 100, the second side 126 being opposite the first side 124. The system further comprises a length determination control unit 502 configured to: determine that an articulation angle between the first frame 102 and the second frame 104 is above a first predetermined angle threshold; determine a first distance between the first distance determination device 108 and a first rear portion 116 of the second frame; determine that an articulation angle between the first frame 102 and the second frame 104 is above a second predetermined angle threshold; determine a second distance between the second distance determination device 110 and a second rear portion 118 of the second frame 104; and determine whether a difference between the first distance and the second distance is lower than a predetermined threshold distance.

FIG. 3 schematically illustrates steps of a method according to the inventive concept. The method comprises: determining 300, by a processor device 502 of a computer system 500, that a first articulation angle 302 between a first frame 102 of an articulated vehicle 100 and a second frame 104 of the articulated vehicle 100 is above a first predetermined angle threshold on a first side 124 of the articulated vehicle 100; determining 304, by the processor device 502, a first vehicle length 306 based on the first articulation angle 302 and a first distance from a first distance determination device 108 arranged in the first frame 102 to a first rear portion 116 of the second frame 104 on the first side 124 of the articulated vehicle 100; determining 308, by the processor device 502, that a second articulation angle 310 between the first frame 102 and the second frame 104 is above a second predetermined angle threshold on a second side 126 of the articulated vehicle 100; determining 312, by the processor device 502, a second vehicle length 314 based on the second articulation angle 310 and a second distance from a second distance determination device 110 arranged in the second frame to a second rear portion 118 of the second frame 104 on the second side 126 of the articulated vehicle 100; and determining 316, by the processor device 502, whether a difference 318 between the first vehicle length and the second vehicle length is lower than a predetermined threshold distance.

Figure 5:
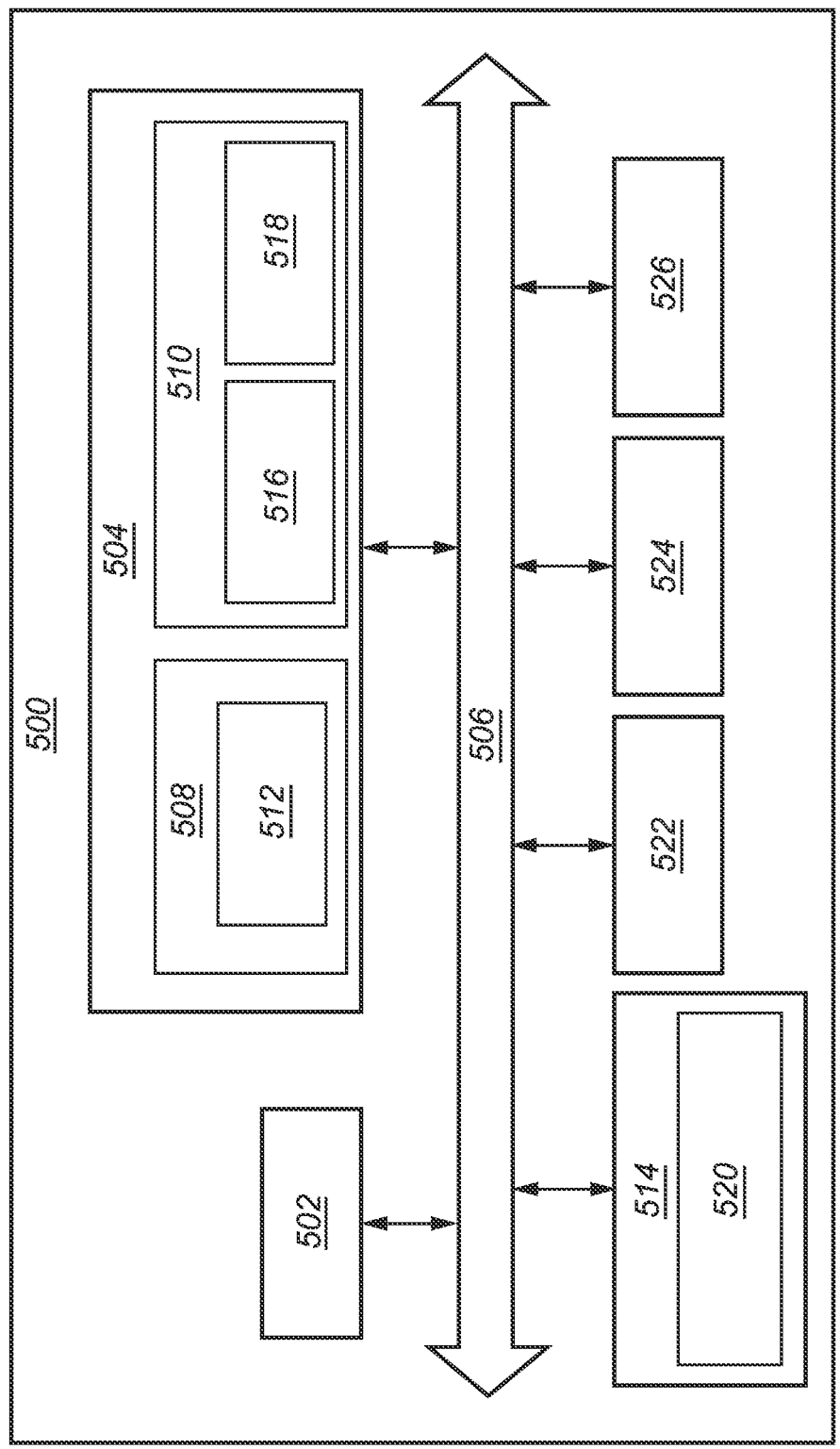
FIG. 5 is a block diagram schematically illustrating a computer system according to one example.

FIG. 5 is a schematic diagram of a computer system 500 for implementing examples disclosed herein. The computer system 500 is adapted to execute instructions from a computer-readable medium to perform these and/or any of the functions or processing described herein. The computer system 500 may be connected (e.g., networked) to other machines in a LAN, an intranet, an extranet, or the Internet. While only a single device is illustrated, the computer system 500 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, a control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 500 may comprise at least one computing device or electronic device capable of including firmware, hardware, and/or executing software instructions to implement the functionality described herein. The computer system 500 may include a processor device 502 (may also be referred to as a control unit), a memory 504, and a system bus 506. The computer system 500 may include at least one computing device having the processor device 502. The system bus 506 provides an interface for system components including, but not limited to, the memory 504 and the processor device 502. The processor device 502 may include any number of hardware components for conducting data or signal processing or for executing computer code stored in memory 504. The processor device 502 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 506 may be any of several types of bus structures that may further interconnect to a memory bus (with or without a memory controller), a peripheral bus, and/or a local bus using any of a variety of bus architectures. The memory 504 may be one or more devices for storing data and/or computer code for completing or facilitating methods described herein. The memory 504 may include database components, object code components, script components, or other types of information structure for supporting the various activities herein. Any distributed or local memory device may be utilized with the systems and methods of this description. The memory 504 may be communicably connected to the processor device 502 (e.g., via a circuit or any other wired, wireless, or network connection) and may include computer code for executing one or more processes described herein. The memory 504 may include non-volatile memory 508 (e.g., read-only memory (ROM), erasable programmable read-only memory (EPROM), electrically erasable programmable read-only memory (EEPROM), etc.), and volatile memory 510 (e.g., random-access memory (RAM)), or any other medium which can be used to carry or store desired program code in the form of machine-executable instructions or data structures and which can be accessed by a computer or other machine with a processor device 502. A basic input/output system (BIOS) 512 may be stored in the non-volatile memory 508 and can include the basic routines that help to transfer information between elements within the computer system 500.

The computer system 500 may further include or be coupled to a non-transitory computer-readable storage medium such as the storage device 514, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 514 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 514 and/or in the volatile memory 510, which may include an operating system 516 and/or one or more program modules 518. All or a portion of the examples disclosed herein may be implemented as a computer program product 520 stored on a transitory or non-transitory computer-usable or computer-readable storage medium (e.g., single medium or multiple media), such as the storage device 514, which includes complex programming instructions (e.g., complex computer-readable program code) to cause the processor device 502 to carry out the steps described herein. Thus, the computer-readable program code can comprise software instructions for implementing the functionality of the examples described herein when executed by the processor device 502. The processor device 502 may serve as a controller or control system for the computer system 500 that is to implement the functionality described herein.

The computer system 500 also may include an input device interface 522 (e.g., input device interface and/or output device interface). The input device interface 522 may be configured to receive input and selections to be communicated to the computer system 500 when executing instructions, such as from a keyboard, mouse, touch-sensitive surface, etc. Such input devices may be connected to the processor device 502 through the input device interface 522 coupled to the system bus 506 but can be connected through other interfaces such as a parallel port, an Institute of Electrical and Electronic Engineers (IEEE) 1394 serial port, a Universal Serial Bus (USB) port, an IR interface, and the like. The computer system 500 may include an output device interface 524 configured to forward output, such as to a display, a video display unit (e.g., a liquid crystal display (LCD) or a cathode ray tube (CRT)). The computer system 500 may also include a communications interface 526 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

The invention claimed is:

1. A computer system comprising a processor configured to:
   determine that a first articulation angle between a first frame of an articulated vehicle and a second frame of the articulated vehicle is above a first predetermined angle threshold on a first side of the articulated vehicle;
   determine a first vehicle length based on the first articulation angle and a first distance from a first distance determination device arranged in the first frame to a first rear portion of the second frame on the first side of the articulated vehicle;
   determine that a second articulation angle between the first frame and the second frame is above a second predetermined angle threshold on a second side of the articulated vehicle;
   determine a second vehicle length based on the second articulation angle and a second distance from a second distance determination device arranged in the first frame to a second rear portion of the second frame on the second side of the articulated vehicle;
   determine whether a difference between the first vehicle length and the second vehicle length is lower than a predetermined threshold distance;
   provide the first and second determined vehicle lengths to a vehicle control system; and
   control, by the vehicle control system, the vehicle based on the first and second determined vehicle lengths.

2. A method, comprising:
   determining, by a processor device of a computer system, that a first articulation angle between a first frame of an articulated vehicle and a second frame of the articulated vehicle is above a first predetermined angle threshold on a first side of the articulated vehicle;
   determining, by the processor device, a first vehicle length based on the first articulation angle and a first distance from a first distance determination device arranged in the first frame to a first rear portion of the second frame on the first side of the articulated vehicle;
   determining, by the processor device, that a second articulation angle between the first frame and the second frame is above a second predetermined angle threshold on a second side of the articulated vehicle;
   determining, by the processor device, a second vehicle length based on the second articulation angle and a second distance from a second distance determination device arranged in the first frame to a second rear portion of the second frame on the second side of the articulated vehicle;
   determining, by the processor device, whether a difference between the first vehicle length and the second vehicle length is lower than a predetermined threshold distance;
   providing the first and second determined vehicle lengths to a vehicle control system; and
   by the vehicle control system, controlling the vehicle based on the first and second determined vehicle lengths.

3. The method of claim 2, further comprising determining that a difference between the first vehicle length and the second vehicle length is lower than the predetermined threshold distance and that a total vehicle length is the largest of the first vehicle length and second vehicle length.

4. The method of claim 3, further comprising providing the total vehicle length to a driver maneuverability control system and adapting the driver maneuverability control system based on the length of the vehicle.

5. The method of claim 3, further comprising providing the total vehicle length to a navigation system and adapting a route of the vehicle based on the length of the vehicle.

6. The method of claim 2, wherein each of the first and the second distance determination devices comprises an image acquisition device configured to acquire an image of the rear portion of the second frame.

7. The method of claim 2, wherein the first and the second distance determination devices comprises a corresponding first and second radar transceiver each configured to acquire a radar image.

8. The method of claim 7, wherein the first and the second radar transceivers are arranged to face a direction substantially perpendicular to a longitudinal axis of the first frame and wherein the first and the second radar transceivers are further configured to detect an object adjacent to the vehicle.

9. The method of claim 2, further comprising determining that the difference between the first vehicle length and the second vehicle length is higher than the predetermined threshold distance and providing a notification to a vehicle control system.

10. The method of claim 2, further comprising determining that the difference between the first vehicle length and the second vehicle length is higher than the predetermined threshold distance and providing a notification to a driver of the vehicle.

11. The method of claim 6, further comprising determining that the vehicle is in motion when determining the first distance and the second distance.

12. The method of claim 11, wherein determining the respective first and second distances comprises identifying a difference between a moving background portion and a first and second rear portion in the respective first and second image.

13. The method of claim 2, wherein each of the first and the second distance determination devices is arranged between a respective front and rear wheel of the first frame.

14. The method of claim 2, wherein each of the first and the second distance determination devices is arranged in front of an articulated joint of the vehicle.

15. The method of claim 2, wherein the articulated joint is located between front wheels of the second frame and the rear wheels of the first frame.

16. The method of claim 2, wherein the first frame is a host vehicle, and the second frame is a trailer.

17. A vehicle comprising the processor device to perform the method of claim 2.

18. A computer program product comprising program code for performing, when executed by the processor device, the method of claim 2.

19. A control system comprising one or more control units configured to perform the method of claim 2.

20. A non-transitory computer-readable storage medium comprising instructions, which when executed by the processor device, cause the processor device to perform the method of claim 2.

\* \* \* \* \*